Patented Dec. 5, 1939

2,182,513

UNITED STATES PATENT OFFICE 2,182,513

METHOD OF SEALING WAXY SURFACES

William I. Buckeridge, Chicago, Ill., assignor to Standard Oil Company, Chicago, Ill., a corporation of Indiana No Drawing. Application May 14, 1936, Serial No. 79,719

5 Claims. (Cl. 154—40)

This invention relates to a process of bonding wax-coated surfaces and, more particularly, to a process of bonding paper which has been coated with paraffin wax. The process is useful in the sealing of waxed paper wrappers and in making articles of waxed paper, and offers many advantages over the process previously employed.

In the sealing of waxed paper it is substantially impossible to employ any of the customary adhesives or sealing compounds such as glue, dextrine, etc. for the reason that the waxy surface effectively repels sealing materials of this type. Asphalt, rubber, colophony and similar materials are undesirable because they contaminate the products with which waxed papers are ordinarily used, i. e., medicinal and food products, beverages, etc.

Accordingly, it has heretofore been the practice, when sealing waxed papers and other wax coated materials, to effect a seal by melting the wax on the surface or by applying melted wax to the point where the seal is desired and allowing the wax to cool. Fairly satisfactory seals have been obtained in this way but there are numerous disadvantages to this method of sealing, particularly to the necessity for the use of heat and the limitation of the strength of the seal to that of the wax employed in coating the paper. Thus, in the case of papers coated with low melting point wax, the seal is difficult to form because of the slow hardening rate of the wax and also seals obtained with low melting waxes are notably weak in warm weather. Accordingly, it is commonly necessary to employ waxes melting around 126 to 130° F. for paper coating, although waxes melting around 120 to 122° F. are otherwise satisfactory and considerably cheaper.

The present invention provides a method of sealing wax-coated materials and waxed paper whereby the use of heat is avoided and whereby a bond is obtained which is substantially stronger than that obtained heretofore. Furthermore, the sealing is accomplished without danger of contamination of food products or other products which may be subsequently brought in contact with the waxed paper. This invention is especially adapted to the sealing of bread wrappers, confections, tobacco, etc., and in the manufacture of waxed paper cartons and other articles, particularly waxed paper drinking cups where a strong bond is desirable and where it is inconvient to employ heat in making the sealing. A commonly used drinking cup of this character is made by cutting a single sheet of paper and forming it into a cone with overlapping edges which must be sealed. In order to obtain a seal of sufficient strength it has been necessary heretofore to form the cup first and wax it afterward.

In my improved process of sealing waxed paper I employ a sealing composition comprised principally of a material hereinafter termed "viscoresin". This material is a transparent, odorless, tasteless synthetic hydrocarbon resin which is plastic at all ordinary temperatures and which retains its plasticity and tenacity at both high and low temperatures. It may be applied to the waxed paper at the point of sealing, either directly or in the form of a solution in a suitable solvent; for example, naphtha, benzene, xylene, carbon tetrachloride, etc. For convenience in applying the viscoresin, a solution containing from 15 to 50% of viscoresin in the solvent may suitably be employed.

After applying the resin to one or both of the surfaces to be sealed, they are firmly pressed together and the solvent is allowed to evaporate. The strength of the bond increases with aging as a result of the gradual penetration of the resin into the paraffin wax coating, a period of aging extending from one hour to a day or more being sufficient depending on the particular wax employed and the conditions of application. As a result the bond is strengthened beyond the strength of the wax itself due to the modifying and toughening effect of the resin on the wax. The presence of a mutual solvent for both the resin and the wax serves to hasten the amalgamation of the wax surfaces and enhance this effect.

The viscoresin may be obtained from various sources. For example, it may be made by the hydrogenation of raw rubber, either natural or synthetic. It is preferred, however, to make it by the polymerization of olefins, for example, butylene and amylene, and particularly, isobutylene. By carrying out the polymerization at a low temperature the resulting product is harder and has a much higher molecular weight. Thus, liquid isobutylene may be cooled below 0° F. and preferably below —40° F. and polymerized by the action of anhydrous aluminum chloride, boron fluoride, tin or titanium chlorides. With thorough agitation the reaction requires but a short time and care should be taken to avoid an extensive rise in temperature. The addition of 1% of boron fluoride to isobutylene at —80° F. brings about polymerization within 5 to 15 minutes. Suitable diluents, such as naphtha, butane, carbon tetrachloride, etc., may be present to facilitate mixing and handling. After the reaction is complete, the catalyst is removed by washing and the product is obtained by evaporating the diluent.

The viscoresin employed in my process should possess a high molecular weight, preferably above 2000 and a product with a molecular weight between 5000 and 15000 is very satisfactory. If the molecular weight of the product is too low the bond obtained in sealing waxed paper will be of insufficient strength for most purposes.

The viscoresin product produced in the foregoing manner is substantially inert chemically, is colorless, odorless, and tasteless. Besides this chemical inertness it has the remarkable property of maintaining its semi-solid plastic consistency throughout a wide range of temperatures from $-100°$ F. or below to temperatures well above the melting point of wax. Therefore waxed products bonded with viscoresins suffer little or no less in the strength of the bond with changes in atmospheric temperature, and especially at low temperatures occurring in cold weather is there no tendency for the bond to become brittle and separate when the seal is subject to flexure.

Other ingredients may be added to modify the character of the viscoresin used in sealing waxed paper in addition to volatile solvents previously mentioned. For example, I may add petrolatum or paraffin, and particularly high melting point paraffin (e. g. $140°$ F.), ceresin wax, carnauba wax, hydrogenated castor oil, and other natural or synthetic waxes. I may also add pigments and/or dyes which may be applied in any desired design or pattern where it is desired to make the location of the seal visible. In compounding other ingredients in this manner, it is important to employ materials which posses a high degree of chemical inertness to avoid the contamination difficulties previously mentioned.

Having now described my invention, what I claim is:

1. The method of cold bonding waxy surfaces which comprises applying to one of said surfaces as a bond therebetween a coating of hydrocarbon plastic selected from the class consisting of isobutylene polymers having a molecular weight of about 2,000 to 15,000 and hydrogenated rubber, and pressing the surfaces together at ordinary temperature.

2. The method of claim 1 wherein the said plastic is applied to said waxy surfaces as a solution in a volatile solvent.

3. As a new article of manufacture, a paper drinking cup comprised of a sheet of wax coated paper formed into a container with overlapping edges, the surfaces between said overlapping edges being cold bonded together by said wax and a hydrocarbon plastic selected from the class consisting of isobutylene polymers having a molecular weight between about 2,000 and 15,000 and hydrogenated rubber, said wax within said bond being penetrated by said plastic whereby its bonding strength is increased.

4. In the manufacture of waxed paper cartons, waxed paper drinking cups and the like wherein the article is formed from a blank cut from a sheet of waxed paper and the surfaces along certain edges are sealed together to form the article, the improvement comprising cold bonding the edges by applying to one of said surfaces, without removing the paraffin therefrom, a permanently plastic adhesive sealing material consisting substantially of a polymerization product of isobutylene having a molecular weight above about 2,000, and pressing said surfaces together at ordinary temperature.

5. The method of cold bonding a wax coated paper sheet to another similarly wax coated paper sheet without removing wax therefrom wherein a bond is produced having a greater strength than that obtained by fusion bonding, comprising applying to the surface of one of said wax coated sheets a solution of a volatile hydrocarbon solvent and a hydrocarbon plastic selected from the class consisting of isobutylene polymers having a molecular weight between about 2,000 and 15,000, and hydrogenated rubber, and pressing said sheets together in the absence of heat before said solvent has entirely evaporated whereby amalgamation of said plastic and wax on said surfaces is facilitated by said solvent.

WILLIAM I. BUCKERIDGE.